United States Patent [19]

Scheffel et al.

[11] Patent Number: 4,637,430
[45] Date of Patent: Jan. 20, 1987

[54] CHECK VALVE

[75] Inventors: Gary W. Scheffel, Streetsboro; Richard J. Medvick, Shaker Heights; William C. Steiss, Parma, all of Ohio

[73] Assignee: Nupro Company, Willoughby, Ohio

[21] Appl. No.: 815,377

[22] Filed: Dec. 31, 1985

[51] Int. Cl.⁴ .............................................. F16K 17/04
[52] U.S. Cl. .............................. 137/516.29; 137/543.21
[58] Field of Search ....................... 137/516.29, 543.21, 137/540

[56] References Cited

U.S. PATENT DOCUMENTS

| | | |
|---|---|---|
| 656,236 | 8/1900 | Wood . |
| 874,652 | 12/1907 | Bailey .............................. 137/516.29 |
| 1,349,253 | 8/1920 | Astrom . |
| 1,913,664 | 6/1933 | Finger ............................ 137/543.21 |
| 2,447,729 | 8/1948 | Bertea . |
| 2,481,713 | 9/1949 | Bertea . |
| 2,673,062 | 3/1954 | Cornelius . |
| 2,736,338 | 2/1956 | Britton ............................ 137/516.29 |
| 2,888,035 | 5/1959 | Thomas . |
| 3,002,528 | 10/1961 | Leissner . |
| 3,361,154 | 1/1968 | Alexandre . |
| 3,662,950 | 5/1972 | McIntosh et al. . |
| 4,049,017 | 9/1977 | Jones . |

FOREIGN PATENT DOCUMENTS

| | | |
|---|---|---|
| 1004439 | 3/1952 | France . |
| 674110 | 6/1952 | United Kingdom . |
| 718653 | 11/1954 | United Kingdom ............ 137/543.21 |
| 1371514 | 10/1974 | United Kingdom . |

Primary Examiner—Robert G. Nilson
Attorney, Agent, or Firm—Fay, Sharpe, Fagan, Minnich & McKee

[57] ABSTRACT

A poppet check valve comprising mating body forming sections which define a valve chamber having a cylindrical inner wall. A generally cylindrical inlet passage connects axially with the valve chamber and a shoulder at the juncture between the inlet passage and the chamber defines an annular valve seat. Positioned in the chamber and extending transversely thereof is a relatively thin disk-like valve element. The valve element has a generally circular imperforate central section of a diameter greater than the diameter of the inlet passage but less than the diameter of the valve chamber. A plurality of legs extend radially from the periphery of the central section into sliding engagement with the inner wall of the valve chamber. A circular seal element is joined to one side of the central section at a location inwardly of its outer periphery to extend axially toward the valve seat. The valve element is maintained under a bias toward the seat by a coil spring mounted in the valve chamber. Positioned between the spring and the valve element is a stop member including a plurality of radially spaced, axially extending force applying elements for engaging the central section of the valve element on the side opposite the seal element. The stop also includes guide surfaces extending radially outwardly of the force applying elements into sliding engagement with the wall of the valve chamber at a location axially spaced from the valve element.

22 Claims, 9 Drawing Figures

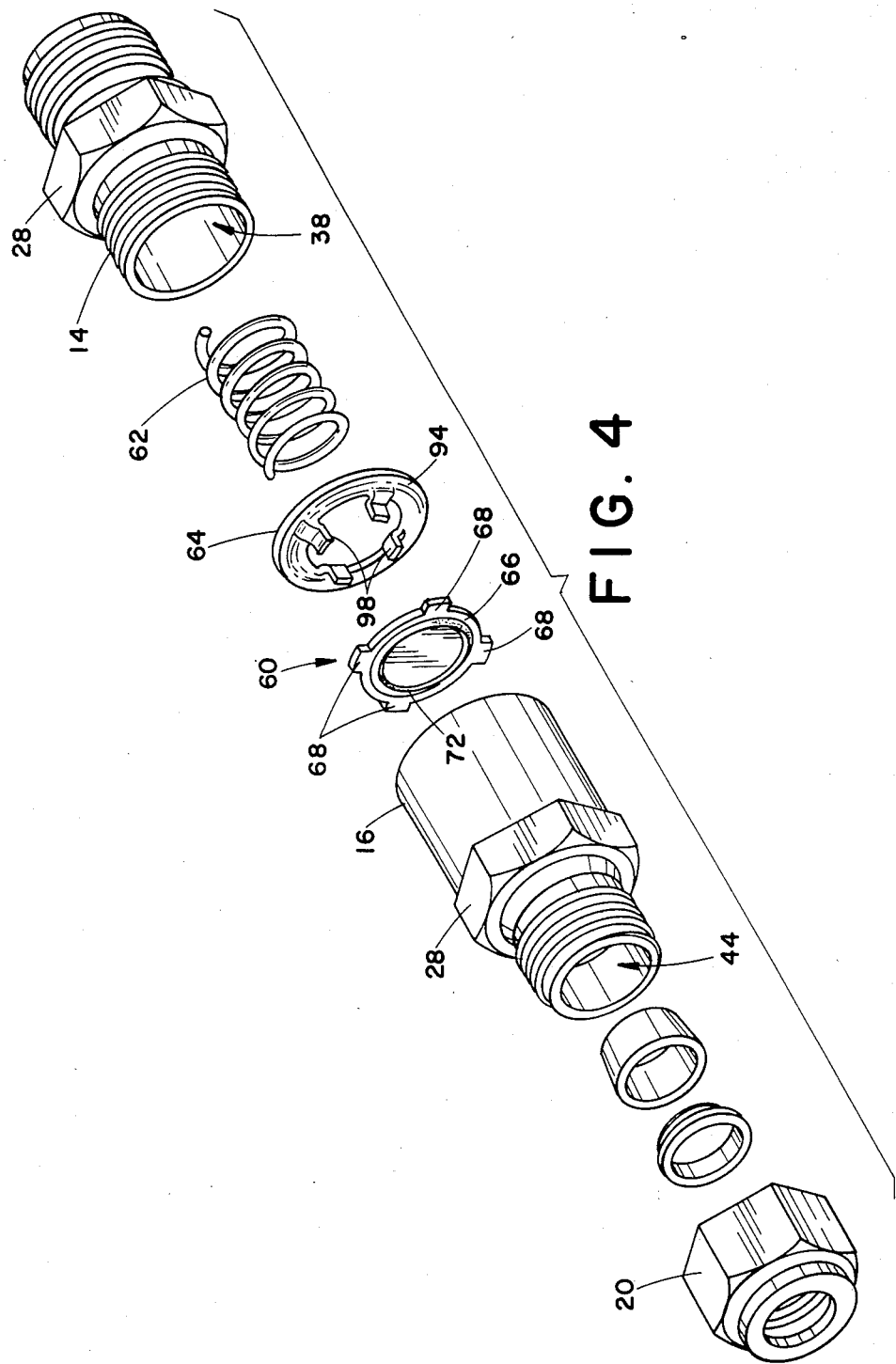

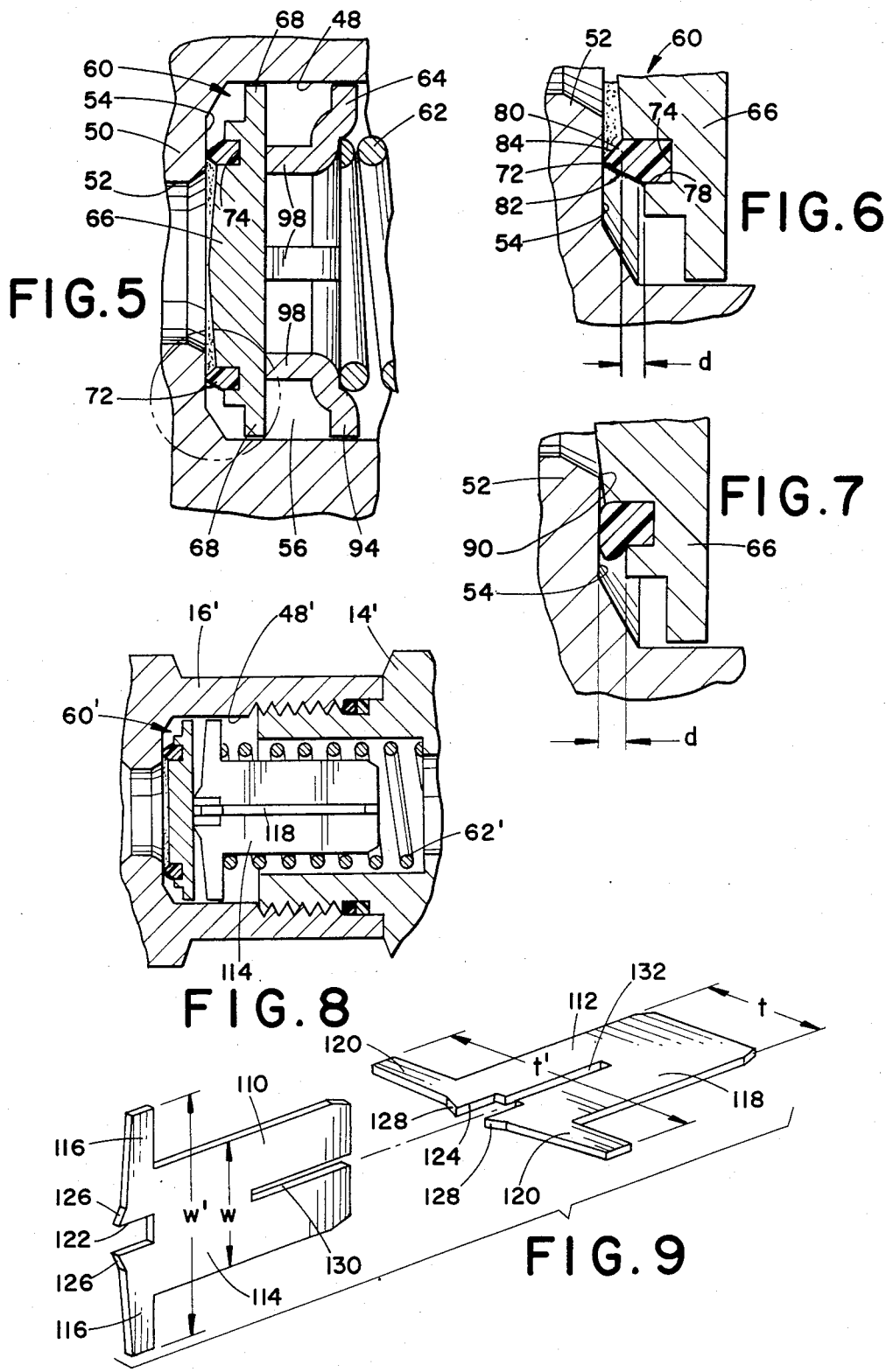

CHECK VALVE

BACKGROUND OF THE INVENTION

The subject invention is directed toward the valve art and, more particularly, to an improved poppet check valve.

The invention is especially suited for small size, high pressure check valves and will be described with particular reference thereto; however, as will become apparent, the invention could be incorporated in check valves of a wide range of sizes, operable under a variety of pressure conditions.

There has been a continuing interest in reducing the size and overall length of poppet-type check valves. Most prior designs employ an elongated poppet moving against relatively long guide surfaces in order to maintain concentricity. Alternatively, separate guide rods and the like are incorporated in the valve chamber. These approaches run counter to the object of size reduction or result in increased pressure drop through the valves.

Another problem with the typical prior poppet-type check valve designs has been in the area of the seals. Seal blow-out, excessive wear and seal material extrusion often result under high pressure conditions or conditions of high back pressure. The various proposals and designs used to overcome these problems generally significantly increase the size of the seals, the valve elements or the seats. In addition, the designs are often complex and difficult to manufacture.

BRIEF DESCRIPTION OF THE INVENTION

The subject invention provides a poppet-type check valve which provides practical and effective solutions to the above-discussed problems. The invention provides a poppet check valve which can be significantly shorter and generally simpler than prior designs.

In accordance with one aspect, the invention provides a poppet check valve including mating body sections which define a cylindrical valve chamber with an axially aligned fluid inlet and an annular seat at the juncture between the inlet and the chamber. A relatively thin disk-like valve element is positioned transversely of the chamber and is guided from the wall of the chamber by a plurality of radially extending legs. A spring extends axially of the chamber and maintains the valve element continually biased toward the seat. Positioned between the valve element and the spring is a poppet stop member which has outer peripheral surfaces which are guided from the wall of the valve chamber and a plurality of axially extending force apply elements which engage the valve element at radially and circumferentially spaced points.

The arrangement of the valve element and the poppet stop is such that limited relative tilting can take place while both elements guide from the walls of the valve chamber. The relationship prevents binding of the elements even though their total length axially of the valve chamber is relatively short.

In accordance with another aspect of the invention, the valve element includes a resilient seal ring which extends toward the seat at a location radially inwardly of the legs. The ring is sized to engage the seat circumferentially of the inlet. The portion of the valve element inwardly of the seal ring has a conical surface such that when the seal compresses against the seat the conical surface engages the juncture between the inlet and the valve chamber with line contact to provide an additional seal area and prevent further compression of the seal.

In accordance with a more limited aspect, the seal ring preferably has a cross-section such that upon compression it expands radially outwardly. Also, the valve element is relieved in the area circumferentially of the seal ring to provide a space into which the seal material can deform. This, in combination with the conical surface, limits the total stress on the seal even under extreme back pressures.

Accordingly, a primary object of the invention is the provision of a poppet-type check valve which can have a very short length.

Another object is the provision of a valve of the type described which employs a thin disk-like valve element designed to limit stress application to the seal ring.

A further object is the provision of a poppet-type valve in which the valve element has low mass to thereby increase the sensitivity of the valve.

Yet another object is the provision of a poppet check valve wherein the poppet stop and poppet valve element are guided from the walls of the valve chamber and can have limited relative shifting or tilting movement without binding.

A still further object is the provision of a valve of the type described which is relatively simple and economical to manufacture.

BRIEF DESCRIPTION OF THE DRAWINGS

The above and other objects and advantages will become apparent from the following description when read in conjunction with the accompanying drawings wherein:

FIG. 4 is a pictorial, exploded view of the valve of FIG. 1;

FIG. 5 is an enlarged cross-sectional view of the valve element and seat portion of the FIG. 1 embodiment;

FIG. 6 is a greatly enlarged view of the circled portion of FIG. 5;

FIG. 7 is a view similar to FIG. 6 but showing the valve element in a fully closed, metal-to-metal sealing position;

FIG. 8 is a view similar to FIG. 2 but showing a modified form of the invention; and, FIG. 9 is a pictorial view of the components used for making the modified poppet stop element of the FIG. 8 embodiment.

DETAILED DESCRIPTION OF THE PREFERRED EMBODIMENTS

Figure 1:
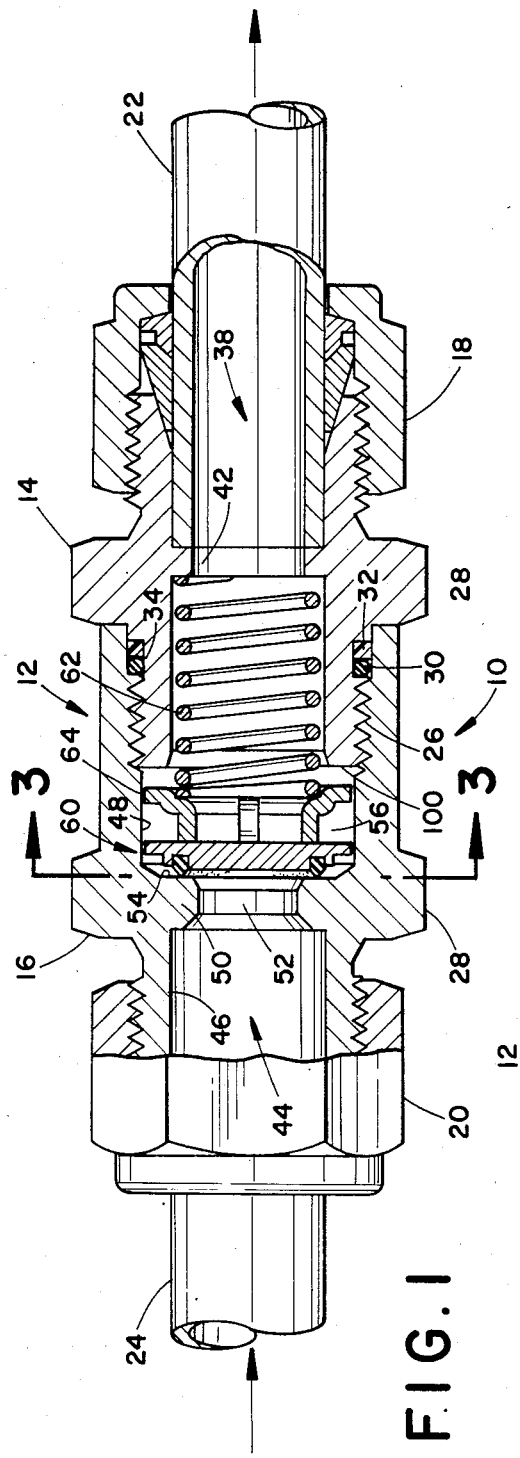
FIG. 1 is a longitudinal cross-sectional view through a poppet check valve formed in accordance with a preferred embodiment of the invention.

Referring more particularly to the drawings wherein the showings are for the purpose of illustrating a preferred embodiment of the invention only, and not for the puprose of limiting same, FIG. 1 shows the overall arrangement of a poppet-type check valve 10 which includes a body 12 comprised of male and female body forming portions 14 and 16, respectively. The outer free ends of the body portions 14 and 16 are provided with suitable connecting means 18 and 20 to allow the valve to be connected to fluid lines 22 and 24 respectively. In the embodiment under consideration the connecting means 18 and 20 are shown as compression-type couplings well known in the art. It should, of course, be understood that these are shown for illustrative purposes only and any particular type of coupling or connecting means could be used to allow the valve to be mounted in fluid lines.

Figure 3:
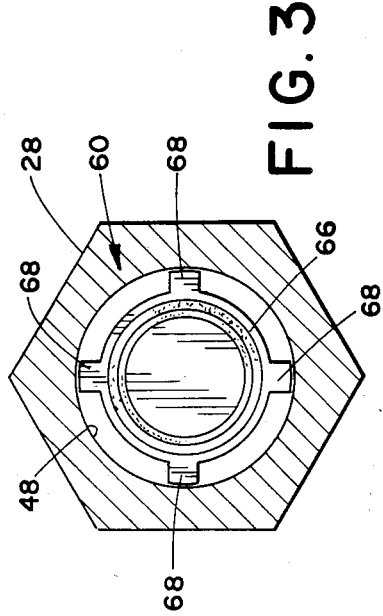
FIG. 3 is a cross-sectional view taken on line 3—3 of FIG. 1.

The body halves or portions 14, 16 are joined in sealed relationship by suitable threads 26. As best seen in FIG. 3, each of the body sections are conveniently provided with wrench flats 28 to facilitate connection and disconnection. In addition, the body halves are sealed relative to one another by an O-ring 30 and a back-up ring 32 suitably carried in a recess 34 formed in the male body member 14.

The male body portion 14 is provided with an axially extending passage 38. The passage 38 includes a reduced diameter flange or shoulder portion 42 located generally midway between its ends. The female body portion is likewise provided with an axially extending through passage 44 including a first portion 46 and a second larger diameter portion 48. Portions 46 and 48 are connected by a radially inwardly extending flange or shoulder 50 and a smaller diameter inlet opening 52. The right-hand surface 54 of flange 50 is preferably flat and extends generally perpendicularly to the longitudinal axis of the body 12. In the embodiment under consideration, surface 54 functions as a valve seat. Consequently, it should be understood that the surface could have other configurations depending on the arrangement of the cooperating valve element.

As can be seen, the enlarged bore portion 48 of the female body portion 16 together with the left-hand end of male body portion 14 cooperate to define a relatively short, cylindrical valve chamber 56 with axially aligned inlet and outlet openings.

Figure 2:
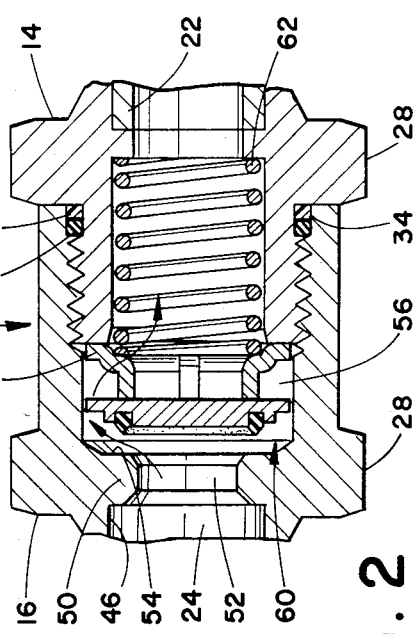
FIG. 2 is a view similar to the center portion of FIG. 1 but showing the valve in an open position.

Mounted within the valve chamber 56 for cooperation with the seat 54 is a valve disk element 60. Element 60 is maintained under a continual bias toward the seat 54 by a coil spring 62 acting through a poppet stop member 64. The arrangement of the valve member 60 and the poppet stop 64 relative to the valve chamber 56 is important to the invention and can best be understood by reference to FIGS. 4 and 5. The preferred arrangement of these elements allows the valve to be significantly shorter than prior art valves and eliminates the need for separate guiding structure or elements. Specifically, as shown in FIGS. 3 and 5, the valve element or poppet 60 is comprised of a generally flat, disk-shaped body 66 formed from any suitable material such as stainless steel or the like. Body 66 has an imperforate, generally circular center portion of a diameter significantly less than the diameter of bore 48 but larger than the passageway 52. Extending radially outwardly from the circular center portion are a plurality of tabs or legs 68. As best shown in FIGS. 3 and 4, the legs 68 are of equal length and are spaced apart at equal circumferential distances about the periphery of body 66. While four of the tabs or legs 66 are shown, it should, of course, be understood that this number could vary. The legs or tabs 68 preferably have a total radial extent only slightly less than the radius of bore 48. Thus, the outer end portions of the tabs 68 guide the valve 60 from the internal surface of bore 48 which defines the valve chamber. The space between adjacent tabs 68 provides a flow passage when the valve element 60 is in the open position shown in FIG. 2.

Carried by body 66 and adapted to cooperate with valve seat surface 54 is an annular elastomeric seal ring member 72 formed from any suitable elastomeric material capable of withstanding the intended operating conditions. As best shown in FIGS. 5 and 6, the elastomeric seal ring 72 is preferably bonded in place in an axially extending circular groove 74 formed in the left-hand end face of valve element body 66. It should be noted that the diameter of the seal ring 72 is slightly greater than the innermost diameter of the seat forming surface 54 so that when in the closed position the seal engages circumferentially about the inlet. As best shown in FIG. 6, the radial outermost wall 78 of groove 74 has a lateral extent substantially less than the inner wall 80. That is, the outer peripheral portion of the circular center of disk 66 is cut away or relieved a distance "d" as shown in FIG. 6. The importance of this relationship will be described hereinafter.

Referring again to the seal ring 72 and FIG. 6, it will be noted that the exposed axial end of the seal ring 72 is formed by intersecting cooperating surfaces 82 and 84. The inner surface 84 is shown inclined such that it makes an angle of about 45° with the seat surface 54. Surface 82, on the other hand, is somewhat more vertical and makes an angle of approximately 70° with surface 54. FIG. 6 shows the valve element 60 in a closed position. Note that the outer end of the seal ring 72 is in sealing engagement with surface 54. With an increase in back pressure or pressure acting on the right-hand side of the valve element 60 is viewed in FIG. 6 the seal ring 72 is continually compressed as the valve body 66 moves closer toward surface 54. The shape of the seal ring 72 causes the seal material to deform radially outwardly. The relieved space identified earlier provides room for the seal material to deform or extrude during this further movement of the valve element. The ultimate maximum extent of movement of the element 66 in a closing direction is shown in FIG. 7. At this time metal-to-metal, sealing contact is made between the inner portion of body 66 and the seat surface 54. The excess seal material is deformed into the space existing between the outer peripheral portion of the disk 66 and surface 54.

In order to improve the metal-to-metal contact and sealing the left-hand side of the valve disk body 66 preferably has a slightly conical configuration as best seen in FIG. 5. This tends to shift the metal-to-metal contact to line contact between corner 90 at the juncture between surface 54 and the inlet portion of passageway 52 (FIG. 7).

As mentioned earlier, the valve disk 60 is maintained under a continual bias toward the valve seat surface 54 by the coil spring 62 acting through the poppet stop member 64. In the embodiment under discussion, the poppet stop member 64 is arranged to allow slight tilting or shifting of the valve disk while generally maintaining it sufficiently aligned so as to prevent binding with the walls of bore 48. Specifically, as best shown in FIGS. 4 and 5, the poppet stop member 64 includes an outer annular rim portion 94 which has an outer diameter slightly less than the inner diameter of bore 48. At its radial inner edge the rim portion 94 is axially depressed as shown in FIG. 5 to provide a seat for receiving and locating the end of coil spring 62. Formed about the inner periphery of rim 94 are a plurality of axially extending force applying elements or fingers 98. Fingers 98 are uniformly spaced about the inner periphery of the rim 94. In the embodiment under consideration four of the fingers 98 are shown but it should be appreciated that more or less could be used without effecting the overall function of the stop member 64.

Preferably, the member 64 is formed by a stamping operation and the fingers 98 are integral with the outer ring or rim portion 94.

Referring again to FIG. 2 it will be seen that when the valve is moved to the open position under the effect of a higher pressure in the inlet line 24 the valve element 60 and the stop member 64 are moved to the right overcoming the bias of spring 62. The total extent of rightward movement is limited by a stop defined by the innermost or left-hand end 100 of male body member 14. When the valve is in the open position shown in FIG. 2, fluid flow can take place around the outer periphery of the disk member 60 between the outwardly extending legs or tabs 68 and then inwardly through the fingers 98 of poppet stop 64. During movement of the valve element 60 and the poppet stop 64 between open and closed positions, shifting and/or some slight tilting of the two elements can take place relative to one another. Generally, however, the arrangement is such that the elements coact to prevent any tilting sufficient to produce binding or the like between their outer peripheries and the inner wall of the bore 48.

Because of the arrangement described, the overall valve can have an extremely short length and good guiding and concentricity of the valve element is maintained without the use of long guide surfaces or separate guide rods or elements. In addition, the total mass of the valve element and poppet stop can be low producing an increased sensitivity and more rapid response.

FIGS. 8 and 9 show an alternative form for the poppet stop element of the valve. In all other particulars the FIGS. 8 and 9 embodiment is identical to that previously described with reference to FIGS. 1 through 7. Accordingly, like reference numerals differentiated by the addition of a prime suffix have been used to identify the same parts. In this embodiment, the poppet stop comprises a pair of flat, somewhat arrow-shaped members 110 and 112 best seen in FIG. 9. Member 110 includes a central body portion 114 which has a width w slightly less than the inner diameter of spring 62'. A pair of wing elements 116 extend laterally from the left-hand end of body 114. The total width w' between the outer ends of wings 116 is slightly less than the bore 48'. Member 112 has generally the same configuration and the width t of its main body portion 118 is also only slightly less than the internal open diameter of coil spring 62'. Similarly, outwardly extending wings 120 have a total width t' which is also only slightly less than the inner diameter of the bore 48'. At the left-hand end of each of the members 114 and 118 there is provided a rectangular recess 122 and 124 respectively. Adjacent each recess are inclined outwardly extending portions 126 and 128 respectively.

The two elements 114 and 116 include cooperating longitudinally extending slots 130 and 132 each having a width equal to the thickness of the corresponding member. As is apparent, this allows the two members to be slid together to form a generally x-shaped element as shown in FIG. 8. Note that the rear or right-hand portion of the stop member is closely received within the coil spring and receives guidance therefrom. The outer end surfaces of the outwardly extending wing portions are slidably guided by the bore 48'. Force is applied from spring 62' to the valve element 60' by contact between the inclined portions 126, 128 of elements 114 and 118 respectively. This alternative form for the poppet stop member provides good flow characteristics and applies the spring force closer to the center of the rear face of the poppet valve element 60'. The advantage of force application in this manner is that in the event the left-hand end or face of the spring 62' is not ground precisely flat, any tilt applied to the poppet stop will not be transmitted to the poppet valve element 60'. This embodiment, therefore, allows looser tolerances with respect to the matter of spring manufacture. In addition, however, this embodiment also achieves extremely good guiding of both poppet stop element and the poppet valve element itself without the use of extended guide surfaces or any separate guide elements.

The invention has been described with reference to the preferred embodiment. Obviously, modifications and alterations will occur to others upon a reading and understanding of this specification. it is intended to include all such modifications and alterations insofar as they come within the scope of the appended claims or the equivalents thereof.

Having thus described the invention, it is now claimed:

1. A poppet check valve comprising:
   (a) mating body forming sections which define a valve chamber having a cylindrical inner wall;
   (b) a generally cylindrical inlet passage connecting with said valve chamber axially thereof;
   (c) a shoulder at the juncture between said inlet passage and said chamber, said shoulder defining an annular valve seat;
   (d) a relatively thin disk-like valve element positioned in said valve chamber to extend transversely thereof, said valve element having a generally circular imperforate central section of a diameter greater than the diameter of said inlet passage but less than the diameter of said valve chamber and a plurality of legs extending radially from the periphery of said central section into sliding engagement with the inner wall of said valve chamber;
   (e) a circular seal element joined to said central section at a location inwardly of its outer periphery and extending axially toward said valve seat;
   (f) a coil spring mounted in said valve chamber and extending axially thereof for maintaining a continual bias on said valve member in a direction toward said seat; and,
   (g) a poppet stop member positioned between said spring and said valve element, said stop member including a plurality of circumferentially spaced axially extending force applying elements for engaging said central section of said valve element on the side opposite said seal elements, and guide surface means extending radially outwardly of said force applying elements into sliding engagement with the inner wall of said valve chamber at a location axially spaced from said valve element.

2. A valve as defined in claim 1 wherein said central section of said valve element has a conical surface located radially inwardly of said seal member for engaging said seat upon a predetermined compression of said seal member against said seat.

3. A valve as defined in claim 1 wherein guide surface means is defined by an annular peripheral surface on said stop member.

4. A valve as defined in claim 1 wherein said central section of said valve element has a relieved portion radially outwardly of said seal member, said relieved portion providing space for said seal member to deflect upon compression of said seal member against said seat.

5. A valve as defined in claim 1 wherein said poppet stop comprises a generally annular body with the outer peripheral surface of said annular body comprising said guide surface means, and said force applying elements being defined by axially extending members carried on the inner peripheral surface of said annular body.

6. A valve as defined in claim 1 wherein said seal member is bonded in a groove in said central section of said valve element, the portion of said central section lying radially outward of said seal member being axially relieved to provide space into which a portion of said seal member can deflect upon compression of said seal member against said seat.

7. A valve as defined in claim 5 wherein said force applying elements are spaced substantially equal distances from one another circumferentially about said inner peripheral surface of said annular body.

8. A valve as defined in claim 1 wherein said stop member has a portion extending axially into said coil spring.

9. A valve as defined in claim 1 wherein said stop member includes a circular recessed portion for receiving an end of said coil spring.

10. A check valve comprising:
(a) a valve body defining a valve chamber having a cylindrical inner wall;
(b) a generally cylindrical inlet passage connecting with said valve chamber axially thereof;
(c) an annular valve seat at the juncture between said inlet passage and said chamber;
(d) a relatively thin disk-like valve element positioned in said valve chamber to extend transversely thereof, said valve element having a generally circular imperforate central section of a diameter greater than the diameter of said inlet passage but less than the diameter of said valve chamber and a plurality of legs extending radially from the periphery of said central section into sliding engagement with the inner wall of said valve chamber;
(e) spring means mounted in said valve chamber and extending axially thereof for maintaining a continual bias on said valve member in a direction toward said seat;
(f) a circular seal element joined to said central section of said valve element at a location inwardly of its outer periphery and extending axially toward said valve seat, said seal element having a cross-sectional configuration such that upon compression against said seat said seal element deforms radially outwardly; and,
(g) the portion of said central section radially inwardly of said seal element having a conical surface located such that upon a predetermined compression of said seal element against said seat said conical surface engages the inner circumferential of said seat with substantially line contact.

11. A check valve as defined in claim 10 wherein the portion of said central section located radially outwardly of said seal ring has a relieved area into which said seal ring can deform upon compression against said seat.

12. A check valve as defined in claim 10 wherein said seal element is bonded in a groove formed in said central section of said valve element.

13. A check valve as defined in claim 10 wherein said legs on said valve element are located at substantially equal distance apart circumferentially about the periphery of said central section.

14. The check valve as defined in claim 13 including a stop member positioned between said spring and said valve element, said stop member including a plurality of axially extending force transmitting elements positioned to engage said valve element at circumferentially spaced locations inwardly of said outer periphery of said central section on the side opposite said seal element.

15. The check valve as defined in claim 14 wherein said stop member includes guide surface means for slidably engaging the inner wall of said valve chamber at a location spaced from said valve element on the side opposite said seal element.

16. The check valve as defined in claim 14 wherein stop member includes means for locating said spring means.

17. The check valve as defined in claim 14 wherein said valve body includes means for limiting the maximum extent of movement of said stop member in a direction axially away from said valve seat.

18. A poppet check valve comprising:
(a) a valve body defining a valve chamber having a cylindrical inner wall;
(b) a generally cylindrical inlet passage connecting with said valve chamber axially thereof;
(c) a shoulder at the juncture between said inlet passage and said chamber, said shoulder defining an annular valve seat;
(d) a poppet valve element positioned in said valve chamber and having a seal element engageable with said valve seat; said valve element further including a plurality of legs extending radially from the periphery thereof into sliding engagement with the inner wall of said valve chamber;
(e) a spring mounted in said valve chamber and extending axially thereof for maintaining a continual bias on said valve member in a direction toward said seat; and,
(f) a poppet stop member positioned between said spring and said valve element, said stop member including a plurality of circumferentially spaced axially extending force applying elements for engaging said valve element on the side opposite said seal element, and guide surface means extending radially outwardly of said force applying elements into sliding engagement with the inner wall of said valve chamber at a location axially spaced from said valve element, said stop member and said valve element being capable of limited tilting relative to one another.

19. A valve as defined in claim 18 wherein said guide surface means is defined by the outer periphery of an annular ring located radially outwardly of said force applying elements.

20. A valve as defined in claim 18 wherein said poppet stop member has a plurality of radially extending members which define said guide surface means.

21. A valve as defined in claim 18 wherein said poppet stop member has means for locating said spring means.

22. A valve as defined in claim 18 wherein said valve element includes a seal ring located radially inwardly of said legs and sized to engage said seat radially outwardly of said inlet passage, the portion of said valve element inwardly of said seal ring having a conical surface such that upon a predetermined compression of said seal ring said conical surface engages the inner periphery of said seat.

* * * * *